(12) United States Patent
D'Urso et al.

(10) Patent No.: US 12,145,567 B2
(45) Date of Patent: Nov. 19, 2024

(54) BRAKING SYSTEM FOR BRAKE BY WIRE VEHICLES PROVIDED WITH HYDRAULIC FEEDBACK SIMULATOR, AND ACTUATION METHOD OF A BRAKING SYSTEM FOR VEHICLES

(71) Applicant: FRENI BREMBO S.P.A., Curno (IT)

(72) Inventors: Luca D'Urso, Curno (IT); Massimo Di Stefano, Curno (IT); Valerio Galizzi, Curno (IT); Fabio Alemanno, Curno (IT); Francesco Dozzi, Curno (IT); Beniamin Szewczyk, Curno (IT)

(73) Assignee: Brembo S.p.A., Bergamo (IT)

( * ) Notice: Subject to any disclaimer, the term of this patent is extended or adjusted under 35 U.S.C. 154(b) by 0 days.

(21) Appl. No.: 16/617,054

(22) PCT Filed: May 8, 2018

(86) PCT No.: PCT/IB2018/053172
§ 371 (c)(1),
(2) Date: Nov. 26, 2019

(87) PCT Pub. No.: WO2018/220455
PCT Pub. Date: Dec. 6, 2018

(65) Prior Publication Data
US 2020/0148182 A1 May 14, 2020

(30) Foreign Application Priority Data
May 31, 2017 (IT) .......................... 102017000059733

(51) Int. Cl.
*B60T 8/94* (2006.01)
*B60T 8/32* (2006.01)
*B60T 8/48* (2006.01)

(52) U.S. Cl.
CPC ................ *B60T 8/94* (2013.01); *B60T 8/326* (2013.01); *B60T 8/4809* (2013.01); *B60T 2270/14* (2013.01); *B60T 2270/404* (2013.01)

(58) Field of Classification Search
CPC ............ B60K 26/021; B60K 2026/022; B60T 8/4072; B60T 8/4081; B60T 8/4086;
(Continued)

(56) References Cited

U.S. PATENT DOCUMENTS 4,655,511 A 4/1987 Leiber
5,439,278 A * 8/1995 Tsukamoto ........... B60T 8/4266
188/162

(Continued)

FOREIGN PATENT DOCUMENTS

CN 104802777 A 7/2015
CN 106458183 A 2/2017
(Continued)

OTHER PUBLICATIONS

EPO translation, DE 197 53 786 A1, Ruffer et al. (Year: 1999).*
(Continued)

*Primary Examiner* — Thomas J Williams
(74) *Attorney, Agent, or Firm* — Marshall & Melhorn, LLC

(57) ABSTRACT

A braking system for vehicles has a pilot pump with a manual actuation device, which is fluidically connected to an absorber device which simulates the driving resistance offered by at least one braking device. The system has at least one control unit operatively connected to at least one sensor and to the manual actuator device and is programmed to actuate the braking device via the actuator device when it receives from the sensors a braking action request signal. The control unit is programmed so as to correct the braking action requested by the user, actuating the manual actuator
(Continued)

device so as to avoid blocking of one or more wheels or the occurrence of instability of the vehicle during braking. The control unit is programmed to induce on the manual actuation device at least one vibration when it corrects the braking action requested by the user.

18 Claims, 3 Drawing Sheets

(58) Field of Classification Search
CPC ........ B60T 2270/82; B60T 8/94; B60T 8/326; B60T 8/4809; B60T 2270/14; B60T 2270/204; B60T 2270/308; B60T 2270/404

See application file for complete search history.

(56) References Cited

U.S. PATENT DOCUMENTS

| | | | | | |
|---|---|---|---|---|---|
| 5,611,606 | A | * | 3/1997 | Nell | B60T 8/4863 303/155 |
| 6,050,653 | A | * | 4/2000 | Wachi | B60T 7/042 303/113.4 |
| 6,309,032 | B1 | * | 10/2001 | Kusano | B60T 7/042 303/113.4 |
| 6,410,993 | B1 | * | 6/2002 | Giers | B60G 17/0185 303/20 |
| 6,476,515 | B1 | | 11/2002 | Yamamoto et al. | |
| 7,082,853 | B2 | | 8/2006 | Fujiwara | |
| 7,798,578 | B2 | * | 9/2010 | Lewis | B60K 6/48 303/151 |
| 9,582,025 | B2 | * | 2/2017 | Jayasuriya | B60T 13/662 |
| 9,845,085 | B2 | | 12/2017 | Besier et al. | |
| 10,647,308 | B2 | * | 5/2020 | Alemanno | B60T 7/042 |
| 2005/0145057 | A1 | | 7/2005 | Fujiwara | |
| 2007/0296268 | A1 | | 12/2007 | Shaw et al. | |
| 2016/0214582 | A1 | * | 7/2016 | Brenn | B60T 7/042 |
| 2017/0129468 | A1 | | 5/2017 | Besier et al. | |
| 2017/0225664 | A1 | | 8/2017 | Beever | |
| 2018/0050670 | A1 | * | 2/2018 | Feigel | B60T 13/745 |
| 2018/0065606 | A1 | * | 3/2018 | Brok | B60T 13/662 |
| 2020/0148182 | A1 | * | 5/2020 | D'Urso | B60T 8/48 |

FOREIGN PATENT DOCUMENTS

| | | | | |
|---|---|---|---|---|
| CN | 106687343 | A | | 5/2017 |
| CN | 208530298 | U | * | 2/2019 |
| CN | 109927695 | A | * | 6/2019 |
| DE | 3619793 | A1 | * | 1/1987 ............... B60T 8/32 |
| DE | 19753786 | A1 | | 6/1999 |
| DE | 10114599 | A1 | | 12/2001 |
| DE | 102004032728 | A1 | | 2/2006 |
| DE | 102013222281 | A1 | | 11/2014 |
| DE | 102014212537 | A1 | | 12/2015 |
| EP | 1864875 | A1 | | 12/2007 |
| EP | 1873026 | A2 | | 1/2008 |
| EP | 2871102 | A1 | | 5/2015 |
| FR | 2561190 | A1 | | 9/1985 |
| JP | H07137622 | A | | 5/1995 |
| JP | 2001522331 | A | | 11/2001 |
| JP | 2002104153 | A | * | 4/2002 |
| JP | 2003205838 | A | | 7/2003 |
| JP | 2004246154 | A | * | 9/2004 |
| WO | WO-2005007476 | A1 | * | 1/2005 ............. B60T 7/042 |
| WO | WO-2005070738 | A1 | * | 8/2005 ............ B60T 8/4086 |
| WO | 2016/015939 | A1 | | 2/2016 |
| WO | WO-2017098419 | A1 | * | 6/2017 ............ B60T 13/662 |
| WO | WO-2024018333 | A1 | * | 1/2024 |

OTHER PUBLICATIONS

European Patent Office, International Search Report with Written Opinion, issued in PCT/IB2018/053172, Jul. 18, 2018, 11 pages, European Patent Office, Rijswijk, Netherlands.

Chinese Patent Office, Chinese Search Report, issued in the corresponding Chinese application No. 201880036559.6, 11 pages, June 3, 20201, China.

China National Intellectual Property Administration, Office Action in Application No. CN 201880036559.6, dated Dec. 2, 2021, 20 pages.

China National Intellectual Property Administration, Office Action in Application No. CN 201880036559.6, dated Apr. 21, 2022, 18 pages.

Korean Intellectual Property Office, Office Action in Application No. KR 10-2019-7038059, dated Feb. 6, 2023, 13 pages.

* cited by examiner

BRAKING SYSTEM FOR BRAKE BY WIRE VEHICLES PROVIDED WITH HYDRAULIC FEEDBACK SIMULATOR, AND ACTUATION METHOD OF A BRAKING SYSTEM FOR VEHICLES

FIELD OF APPLICATION

The present invention relates to a braking system for brake wire vehicles provided with hydraulic feedback simulator, and to a respective actuation method of a braking system for vehicles.

PRIOR ART

In particular, the present invention relates to the field of pedal simulators for "by wire" braking systems for motor vehicles. In general, the present invention also relates to manual simulators of any type, therefore also lever, for by-wire braking systems of vehicles in general, thus also including motor vehicles, heavy vehicles and the like.

In "by wire" systems there is generally a decoupling between force and displacement imparted to the pedal or lever by the user and the pressure/force actually applied in the calipers or other braking devices connected to the wheels of the vehicle.

A simulator of manual actuation devices, whether pedal or lever, can be implemented with the use of different technologies, all comprising electric actuation means of the braking devices independent of the manual operation of the operator. Such electric drive means typically comprise electric motors which actuate the braking devices as a function of the braking request made by the user via the manually operated devices. Therefore, under normal operating conditions, there is never a direct connection between the manual operating device and the braking devices; obviously, simulators are provided which return to the user a resistance equivalent to that of a traditional braking system.

Typically, the simulator consists of a master cylinder, that is, a main pump connected to the manual actuation device (pedal or lever) through a main branch, and an absorber which returns to the user a reaction equivalent to that normally generated by a braking device in a traditional braking system. As seen, the actual braking action is instead effected by the electric actuation means which directly activate the braking devices as a function of the braking force requested by the user.

Moreover, the known braking systems provide a secondary or back-up branch which serves to directly connect the master cylinder to the braking devices in case of malfunction or blackout of the electric drive means. This back-up branch is obviously a safety since, even in the event of a malfunction of the electrical devices, it allows the user to operate the braking devices as occurs in a conventional hydraulic system.

The management from the main branch and the secondary branch takes place typically through appropriate valves; in particular, a first normally open valve serves to isolate the master cylinder from the back up branch and to connect the hydraulic absorber with the master cylinder: in this way, the necessary feedback (pedal or lever force–pedal or lever stroke) is provided to the driver.

A second valve, normally closed, is also provided on the connection branch between the master cylinder and the absorber. This second valve, on the other hand, is opened in the event of a malfunction or blackout: due to this second valve, the master cylinder is directly connected to the braking devices so as to allow direct actuation thereof by the user.

Known solutions are certainly safe but do not allow returning to the user a feeling of the effective actuation of the braking devices and, above all, in case of braking correction due, for example, to the occurrence of a locking of one or more wheels of the vehicle, they do not return to the user the sensation of the actual occurrence of the dynamic instability of the vehicle and of the necessary correction by the system.

In other words, in known type of brake-by-wire systems, the user does not notice the braking correction intervention carried out by the system control unit to avoid blocking one or more wheels and to correct for example an incorrect trajectory and/or an excessive braking depending on this trajectory.

The fact that the user does not notice, at the pedal or at the lever, the intervention of the correction due to the principle of a dynamic instability of the vehicle is dangerous since the user, unaware of such instability, does not modify his/her own driving behavior. It is clear that braking correction systems, either merely anti-blocking and/or correcting the trajectory by braking one or more wheels, are capable of correcting driver errors within certain limits; if the driver does not notice that his/her driving behavior puts the vehicle in limit conditions of stability in relation to the route followed, the situation can become dangerous.

In fact, driving conditions may occur that cannot be corrected by the braking system and therefore there may be a dangerous and sudden loss of control of the vehicle, without the driver having any indication of such events.

Moreover, known solutions provide, in the event of an electrical fault, the direct actuation of the braking devices by the user through the above secondary branch connecting the master cylinder to the braking devices: in fact, the master cylinder, in the event of an electric fault, is immediately connected to the braking devices, in the traditional manner, while the main branch leading to the braking simulator is occluded.

In this way, however, an immediate extension of the pedal stroke with respect to the standard operation occurs, since the user must manually brake, by exerting with the pedal (or the lever) the force necessary to obtain the required braking.

This sudden elongation on one side is negatively felt by the user and, on the other hand, can generate dangerous situations. In fact, a sudden and significant lengthening of the pedal stroke requires the user's ability to instantly adapt to the new 'calibration' of the pedal, or the braking distance may increase and lead to an unbalanced braking.

DISCLOSURE OF THE INVENTION

In order to solve the problems mentioned above, no solutions have been adopted in the art to date.

In fact, known brake-by-wire systems provide solutions aimed at improving the passive safety of the system, ensuring braking even in the event of an electrical malfunction, or even solutions aimed at faithfully reproducing the stroke/resistance to the pedal or lever of a traditional hydraulic system. In any case, known systems are always designed so as to avoid any feedback to the pedal or lever of possible braking correction interventions by the system.

Moreover, where feedback devices are provided on the pedal, known systems, as seen, provide for the direct hydraulic actuation of the braking devices by the user, in the event of an electrical fault, with the above problems of lengthening the pedal stroke and negative feeling for the user.

The need to solve the drawbacks and limitations mentioned with reference to the prior art is therefore increasingly felt. In other words, the need is felt to implement a by-wire braking system that is able to warn the user of the correction interventions made by the system on the user's braking request, that is to say, a system that is able to warn the user of the phenomenon of instability of the vehicle due to the driving behavior in relation to the ground conditions and that, in the event of an electrical fault, allows effective braking without problems of lengthening the pedal stroke and without giving the user an ineffective braking sensation.

Such a need is met by a braking system for vehicles and by an actuation method of a braking system for vehicles according to the claims described herein.

In particular, this need is met by a braking system for vehicles comprising

- a pilot pump provided with lever and/or pedal-operated manual actuation means, which is fluidically connected, by means of a first hydraulic duct to an absorber device which simulates the drive resistance offered by at least one braking device associated with a wheel of said vehicle, wherein, along said first hydraulic duct a first shut-off valve is arranged,
- at least one electromechanical and/or electro-hydraulic actuator device operatively connected to at least one electricity storage device and to said at least one braking device for the actuation of the latter,
- at least one sensor, belonging to a group comprising position sensors of the stroke and/or rotation of the lever or pedal or of a float or of a push-rod of the pilot pump, force sensors of the force applied to said lever or pedal or to a float or cylinder of the pilot pump, pressure sensors of the pilot pump delivery pressure, suitable to detect the occurrence and magnitude of a braking action request exerted by the user through said lever or pedal,
- the system comprising at least one control unit operatively connected to said at least two sensors and to the at least one actuator device and being programmed so as to actuate the braking device by means of the actuator device when it receives from said sensors a braking action request signal,
- wherein the control unit is programmed so as to correct the braking action requested by the user, actuating the actuator device so as to avoid blocking of one or more wheels or the occurrence of instability of the vehicle during braking,
- wherein the control unit is programmed to induce on the manual actuation means at least one vibration when it corrects the braking action requested by the user.

According to a possible embodiment, said at least one sensor comprises a dual power supply via two distinct electricity storage devices.

According to a possible embodiment, the braking system comprises at least two sensors belonging to a group comprising position sensors of the stroke of the lever or pedal, force sensors of the force applied to said lever or pedal, pressure sensors of the pilot pump delivery pressure, suitable to detect the occurrence and magnitude of a braking action request exerted by the user through said lever or pedal.

According to a possible embodiment, at least one pressure sensor is provided arranged along the first hydraulic duct or in correspondence with the absorber device.

According to a possible embodiment, at least one force sensor is provided on the manual actuation means or on a pilot pump float or cylinder.

According to a possible embodiment, at least one position and/or rotation sensor is provided applied on the manual actuation means or on a piston of the pilot pump, so as to detect the stroke/position thereof.

According to a possible embodiment, the system comprises at least two electricity storage devices which each power at least control unit at least one actuator device said electricity storage devices being of different types.

According to a possible embodiment, said at least two electricity storage devices are interconnected electrically with each other.

According to a possible embodiment, the at least one control unit is programmed so that, during the correction of the braking action requested by the user, it alternately opens and closes the first shut-off valve so as to create a pressure variation on the first hydraulic duct and on the manual actuation means.

According to a possible embodiment, the system comprises means for adjusting the pressure in the first hydraulic duct operatively connected to the control unit so as to change the pressure in said first hydraulic duct to induce at least a vibration on the manual actuation means, during the correction of the braking action requested by the user.

According to a possible embodiment, said pressure variation means in the first hydraulic duct comprise a pump with axial or radial pistons, fluidically connected with said first hydraulic duct.

According to a possible embodiment, said pressure variation means in the first hydraulic duct comprise a cam-piston system, the piston being fluidically connected with said first hydraulic duct.

According to a possible embodiment, the system comprises movable mechanical means, arranged between the manual actuation means and the pilot pump, said movable mechanical means being operatively connected to at least a control unit which is programmed so as to induce vibrations on the manual actuation means by actuating the movable mechanical means, during the correction of the braking action requested by the user.

According to a possible embodiment, the movable mechanical means comprise a rotary electric motor provided with eccentric mass with respect to a rotation axis of the motor.

According to a possible embodiment, the movable mechanical means comprise an electric motor with relative sliding mass.

According to a possible embodiment, the movable mechanical means are vibrating mechanical means which comprise a piezoelectric device.

According to a possible embodiment, said piezoelectric device is associated with a relative mass.

According to a possible embodiment, said braking devices comprise a disc brake, or drum or shoe brake.

The present invention also relates to an actuation method of a braking system for vehicles, comprising the steps of:

- providing a pilot pump provided with lever and/or pedal-operated manual actuation means, which is fluidically connected, by means of a first hydraulic duct to an absorber device which simulates the drive resistance offered by a hydraulically-operated braking device associated with a wheel of said vehicle, wherein, along said first hydraulic duct a first shut-off valve (28) is arranged, providing at least one electromechanical and electro-hydraulic actuator device operatively connected to at least one electricity storage device and to said at least one braking device for the actuation of the latter, providing at least two sensors, belonging to a group comprising position sensors of the stroke of the lever or pedal, force sensors of the force applied to said lever or pedal, pressure sensors of the pilot pump delivery pressure, suitable to detect the occurrence and magnitude of a braking action request exerted by the user through said lever or pedal, providing at least one control unit operatively connected to said at least two sensors and to the at least one actuator device and being programmed so as to actuate the braking device by means of the actuator device when it receives from said sensors a braking action request signal, correcting, by means of the control unit the braking action requested by the user, actuating the actuator device so as to avoid blocking of one or more wheels or the occurrence of instability of the vehicle during braking, inducing on the manual actuation means at least one vibration when the control unit corrects the braking action requested by the user.

DESCRIPTION OF THE DRAWINGS

Further features and advantages of the present invention will appear more clearly from the following description of preferred non-limiting embodiments thereof, in which.

Elements or parts of elements in common to the embodiments described below are referred to with the same reference numerals.

DETAILED DESCRIPTION

Figure 1:
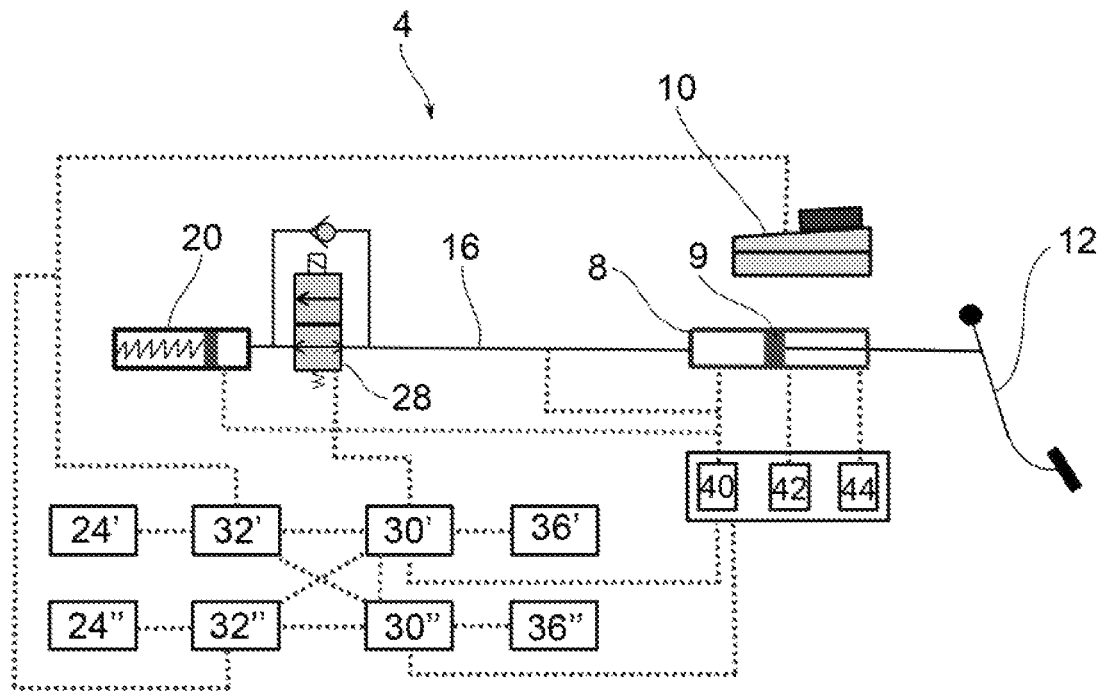
FIGS. 1-5 shows schematic views of a braking system for vehicles according to possible embodiment variants of the present invention.

With reference to the above figures, reference numeral 4 globally denotes a braking system for vehicles.

For the purposes of the present invention, vehicles means both motor vehicles and motor cycles.

The braking system 4 for vehicles comprises a pilot pump 8 provided with a manual actuation means 12, lever and/or pedal.

Typically, the pilot pump 8 comprises a float 9 which is moved by the user's mechanical action on the manual actuation means 12, either lever or pedal operated. The float 9 has the function of putting a fluid under pressure.

It is to be noted that the fluid influenced by the float 9 is not necessarily a brake fluid, since it is sufficient to use a fluid which is stable over a temperature range lower than that of a brake fluid.

The fluid is in turn contained in a tank 10 fluidically connected to the pilot pump 8, in a known manner.

The pilot pump 8 is fluidically connected, by means of a first hydraulic duct 16 containing brake fluid in a known manner, to an absorber device 20 which simulates the drive resistance offered by at least one braking device 24 associated with a vehicle wheel.

The absorber device 20 serves to provide resistance to the actuation of the manual actuation means 12 so as to simulate the normal resistance that a user would have on the manual actuation means 12 as a result of a braking action with said at least one braking device 24. The absorber device 20 is typically a mechanical device provided with springs and similar devices, such as viscoelastic devices, for simulating the resistance provided by the common hydraulically actuated brake calipers.

For the purposes of the present invention, the braking device 24 can be of various types, for example comprising a disc brake, or a drum brake or a shoe brake.

Along said first hydraulic duct 16, a first shut-off valve 28 is arranged.

The first shut-off valve 28 can be opened and closed: in the open configuration, it allows the fluid connection between the pilot pump 8 and the absorber device 20; in closed configuration, said first shut-off valve 28 disconnects the absorber 20 from the pilot pump 8.

Operation of the braking system is managed by at least one processing and control unit 30.

The braking system further comprises at least one electromechanical and/or electro-hydraulic actuator device 32 operatively connected to at least one electricity storage device 36 and to said at least one braking device 24 for the actuation of the latter.

In essence, the electromechanical and/or electrohydraulic device is electrically powered by at least one electricity storage device 36 so as to selectively activate at least one braking device 24.

Preferably, the braking system 4 comprises at least two electricity storage devices 36', 36", each supplying at least one processing and control unit 30', 30" and at least one actuator device 32', 32". Preferably, said electricity storage devices 36', 36" are of different types/technology: for example, they can comprise lithium ion, lead accumulators and so on.

According to an embodiment, said at least two electricity storage devices 36', 36" are interconnected electrically with each other.

Preferably, a redundancy of electricity storage devices 36', 36" is implemented so as to feed different actuator devices 32', 32" as well as different processing and control units 30', 30". This redundancy increases safety in the event of a possible electrical fault of the braking system 4, thus guaranteeing the braking capacity of system 4.

The braking system 4 comprises at least one sensor 40, 42, 44, belonging to a group comprising position sensors 40 of the stroke and/or rotation of the manual actuation means 12 (either lever or pedal) or of the float 9 or of an end cap of the pilot pump 8, force sensors 42 of the force applied to the manual actuation means 12 or to the float 9 or cylinder of the pilot pump 8, pressure sensors 44 of the delivery pressure of the pilot pump 8.

The above sensors 40, 42, 44 are all adapted to detect the onset and the magnitude of a request of braking action exerted by the user through said lever or pedal 12.

In other words, the request for braking action that the user exerts through the manual actuation means 12 is not directly detected by pressurizing the hydraulic fluid driven by the float 9 which acts on hydraulic components (as in known solutions), but must be detected by sensors 40, 42, 44.

Moreover, these sensors cannot limit themselves to detecting a request for braking action by the user, but must also detect the intensity desired by the user himself/herself.

The intensity can be assessed by measuring the position or stroke of the manual actuation means 12 or of the float 9 by means of the position/stroke and/or rotation sensor 40, said intensity being greater when the stroke or displacement/rotation of the relative operated device is increased.

Alternatively or in addition, it is possible to measure the force applied by the user on the manual actuation means 12 or on the float 9, by means of the force sensor 42, said intensity being greater as the force applied manually by the user increases.

The force sensor 42 can also be applied to the float 9 or to the cylinder of the pilot pump 8.

Moreover, it is possible, alternatively or in addition, to measure the pressure generated by the user downstream of the float 9, i.e. in the first hydraulic duct 16, by means of the manual actuation means 12, by means of the pressure sensor 44, said intensity being higher as the pressure generated manually by the user is increased.

It is also possible to arrange the pressure sensor 44 at the absorber device 20.

For the purposes of the safety of the braking system 4, the signal, or the devices connected to the relative sensors, with which the system receives the request for braking by a user, must be redundant.

According to a possible embodiment, said at least one sensor comprises a dual power supply via two distinct electricity storage devices 36', 36" as described above.

According to a further possible embodiment, the braking system comprises at least two sensors belonging to a group comprising the above position sensors 40, force sensors 42 and pressure sensors 44, all adapted to detect the onset and the magnitude of a request for a braking action exerted by the user through said lever or pedal (12).

It is therefore preferable to provide at least two sensors 40, 42, 44 in order to have both a redundancy on the measurement and the possibility of comparing measurements of the requests and intensity of the braking action with each other.

Preferably, but not exclusively, said sensors are different from each other; even more preferably, there are three distinct sensors 40, 42, 44.

Even in the case of redundancy of the sensors 40, 42, 44 it is possible for at least one or both of them to provide a dual power supply by means of two separate electricity storage devices 36', 36".

As mentioned above, the braking system 4 comprises at least one control unit 30', 30" operatively connected to said at least two sensors 40, 42, 44 and to the at least one actuator device 32', 32", which is programmed so as to actuate at least one braking device 24', 24" by means of the corresponding actuator device 32', 32" when it receives from said sensors 40, 42, 44 a braking action request signal.

The braking action request desired by the user is not always the best choice in relation to the dynamic conditions of the vehicle, also in relation to the type of terrain/asphalt and possible roughness of the road.

In particular, the control unit 30', 30" is programmed so as to correct the braking action requested by the user, actuating the actuator device 32', 32", and thus the corresponding braking device 24', 24" so as to avoid blocking of one or more wheels or the occurrence of instability of the vehicle during braking.

The correction can be either active and passive: in other words, the processing and control unit 30', 30" can correct the braking action requested by the user because it is excessive in relation to the contingent conditions of the vehicle, or it can intervene actively by activating at least one actuator device 32', 32" and therefore generating a braking action not requested by the user in order to correct the vehicle trajectory and/or improve the dynamic stability of the vehicle.

The control unit 30', 30" is programmed to induce on the manual actuation means 12 at least one vibration when it corrects the braking action requested by the user.

In this way, the user is directly informed of the occurrence of an incorrect braking maneuver or of the occurrence of a vehicle instability condition in order to modify his/her driving behavior. To this end, therefore, the braking system must promptly notify the user that the processing and control unit 30', 30" is actively intervening on the stability of the vehicle, correcting the driving behavior of the vehicle user.

To this end, according to a possible embodiment of the present invention (FIGS. 1-2), the at least one control unit 30', 30" is programmed so that, during the correction of the braking action requested by the user, it alternately opens and closes the first shut-off valve so as to create a pressure variation on the first hydraulic duct 16 and on the manual actuation means 12.

In particular, the processing and control unit 30', 30" controls the alternate opening/closing of the first shut-off valve 28: this operation is followed by the generation of a pressure difference in the hydraulic circuit, and in particular in the first hydraulic duct 16 between upstream and downstream of the first shut-off valve 28, following the pressure of the manual actuation means 12 (either lever or pedal) by the driver. In this way, from the repeated closing and opening of the first shut-off valve 28, controlled by the processing and control unit 30', 30", the passage of brake fluid in the absorber device 20 results in reduced time intervals. This condition induces a desired vibrational state on the manual actuation means 12, in order to provide the driver of the vehicle with a feedback similar to that which would occur in the same situation in a vehicle with a conventional hydraulic braking system.

Figure 2:
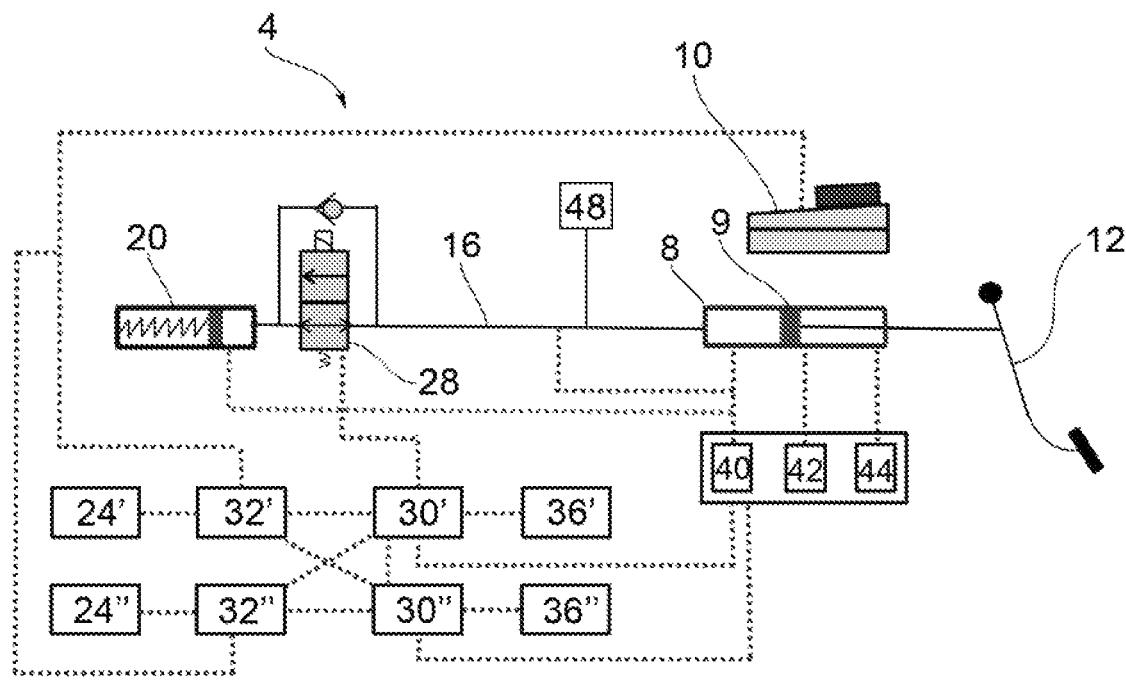

According to a further embodiment of the invention, the system 4 comprises means for adjusting the pressure 48 8 FIG. 2) in the first hydraulic duct 16 operatively connected to the control unit 30', 30" so as to change the pressure in said first hydraulic duct 16 to induce at least a vibration on the manual actuation means 12, during the correction of the braking action requested by the user.

For example, said pressure variation means 48 in the first hydraulic duct 16 comprise a pump with axial or radial pistons, fluidically connected with said first hydraulic duct 16. This axial or radial piston pump is able to create a cyclic pressure variation in the first hydraulic duct 16 which can be sensed on the manual actuation means 12 in the form of vibrations.

According to a further embodiment, said pressure variation means 48 in the first hydraulic duct 16 comprise a cam-piston system, the piston being fluidically connected to said first hydraulic duct 16, so as to induce a cyclical variation of the pressure in the first hydraulic duct 16 sensed on the manual actuation means 12 in the form of vibrations.

Of course, in the embodiments with pressure variation means 48, said pressure variation means 48 will generate a hydraulic pressure capable of overcoming the load to the manual actuation means 12 imparted by the driver.

There are other ways to induce a vibration on the manual actuation means 12.

Figure 3:
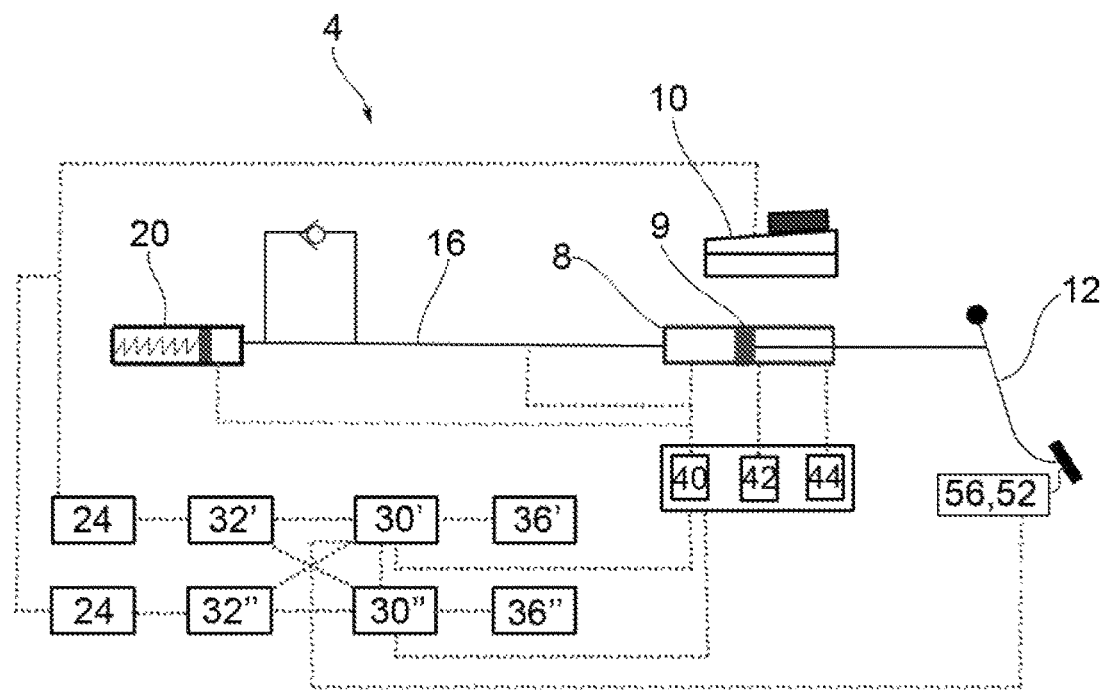

For example, according to a further embodiment (FIG. 3), the system 4 comprises movable mechanical means 52, arranged between the manual actuation means 12 and the pilot pump 8, operatively connected to at least one control unit 30', 30" programmed so as to induce vibrations on the manual actuation means 12 by actuating the movable mechanical means 52, during the correction of the braking action requested by the user.

For example, the movable mechanical means 52 comprise a rotary electric motor 56 provided with eccentric mass with respect to a rotation axis of the motor.

Figure 4:
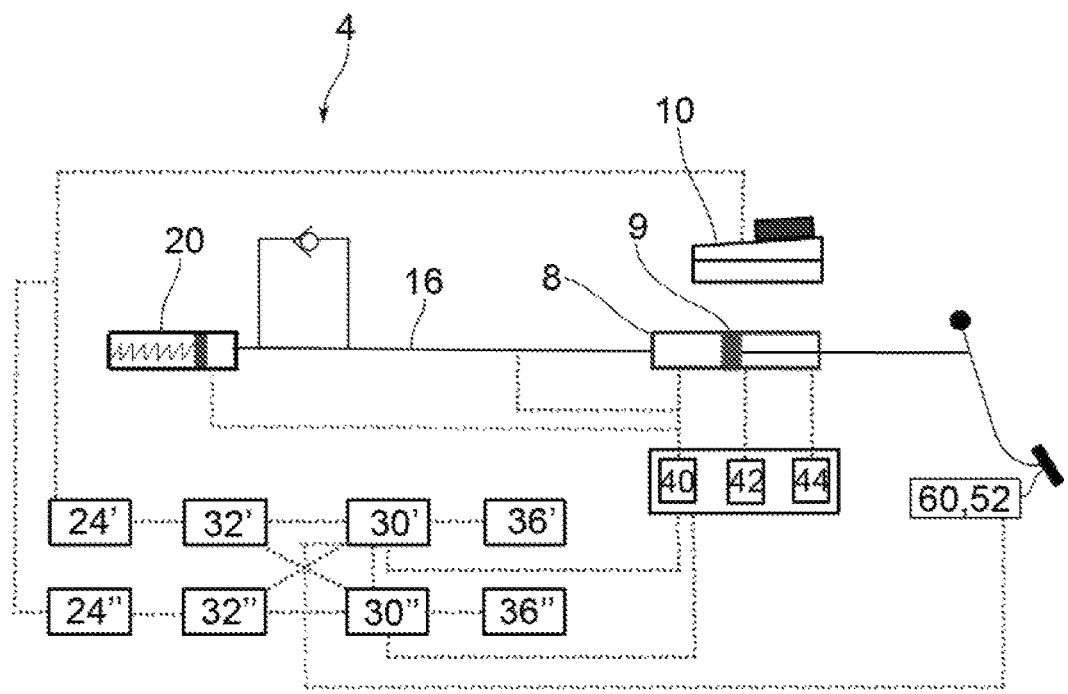

According to a further embodiment (FIG. 4), the movable mechanical means 52 comprise an electric motor with relative sliding mass 60.

The movable mechanical means 52 may further comprise vibrating mechanical means provided with at least one piezoelectric device, preferably associated with a relative mass.

Figure 5:
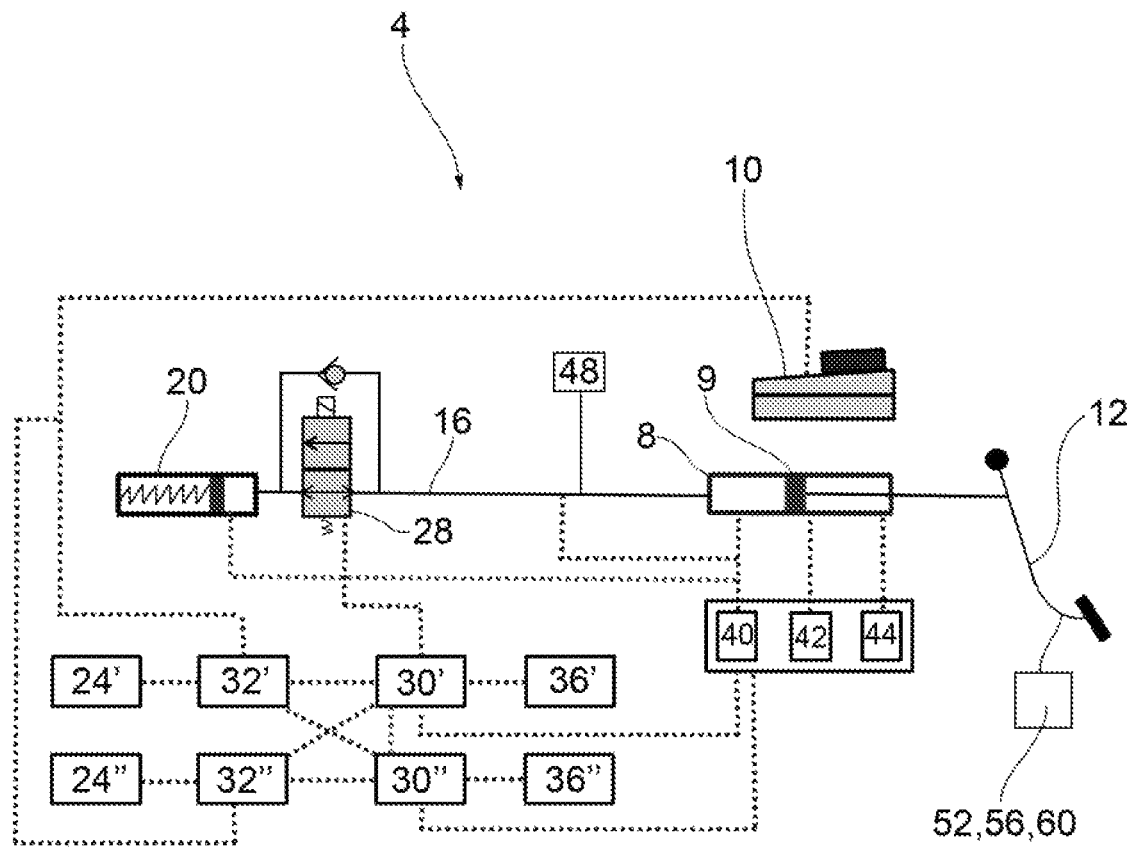

It is also possible to provide an embodiment in which the system simultaneously comprises both pressure variation means 48 and movable mechanical means 52 (FIG. 5).

In fact, the simultaneous intervention of the pressure variation means 48 and of the movable mechanical means 52, managed by the control processing unit 30, allows reaching the desired vibrational frequency values on the brake pedal 12, mimicking the feedback to the driver supplied by a conventional hydraulic system.

As can be appreciated from the foregoing, the braking system for vehicles according to the invention overcomes the drawbacks of the prior art.

In particular, the system according to the proposed invention allows giving the driver a sensation at the pedal or at the lever of the dynamic state of the vehicle, when the latter is in anti-blocking (ABS) or braking stability control (DSC) operation, or in a situation at the limit of road grip.

The advantage of such a solution is that of providing the driver with a sensation at the pedal or at the lever similar to that which returns a conventional hydraulic braking system equipped with ABS and/or DSC (dynamic stability control), so as to signal to the driver a state of potential driving danger and unintentional response of the vehicle to the controls of the driver.

Advantageously, the system according to the present invention is capable of warning the driver of its braking correction intervention: in this way, the driver receives feedback through the manual actuation means, whether lever or foot operated, and can for example notice the incorrectness of his/her driving mode and thus modify it accordingly. This feedback, as seen, consists in a reaction to the manual command that not only opposes the intensification of the braking action but also tends to reduce it by returning the manual control to a position of lower braking demand.

Therefore, the proposed solution allows giving the driver a feeling of the state of the vehicle at the pedal, when it is in ABS braking, i.e. in a situation at the limit of the grip with the road surface, and/or in the event of a partial failure of the braking system BbW and/or if the vehicle operates in a fading state, i.e. a reduction in the stopping power of the vehicle, and/or to signal the state of the system, such as brake pad and/or disk wear.

The advantage of such a solution is that of providing the driver with a pedal sensation similar to that returned by a conventional hydraulic braking system, in such a way as to signal to the driver a state of potential driving hazard and non-faithful vehicle response to the controls of the driver, or an installation problem requiring the maintenance of the braking system.

Moreover, the solution of the present invention, unlike known solutions, allows, in the event of an electrical fault, ensuring effective braking without causing a sinking of the pedal actuated by the user, or a hardening in case of fault affecting the booster.

In this way, even in the event of an electrical fault, the user will feel the same resistance and stroke in the pedal of the system and can therefore provide a well-calibrated braking request, which will then be obtained by means of the electromechanical or electro-hydraulic actuators.

The plant also acts promptly and repeatably and reliably.

The braking system of the present invention has a relatively low cost and involves a possible weight increase which is quite limited and therefore acceptable, with respect to conventional brake-by-wire solutions of the prior art.

Moreover, in the system according to the invention, with reference to the modulation solution of the first shut-off valve, the valve that separates the pilot pump from the simulator or absorber device is modulated, and therefore the ABS feedback function is unrelated to the presence of a hydraulic circuit in the brake-by-wire operating mode, making the performance of this function more flexible and suitable for more system lay-outs.

Further advantages of the solution according to the invention are that the Brembo control software for providing the ABS feedback is simple because completely independent of the vehicle braking control software.

Moreover, the present solution guarantees the ABS feedback to the driver regardless of the type of actuator provided on the vehicle, while solutions of the prior art are closely linked to the presence of a hydraulic only brake circuit (therefore, these known solutions are not applicable to the case of only electromechanical braking).

Moreover, the present solution allows isolating the pedal simulator and the actuators, if one does not intend to provide the hydraulic back-up, thus allowing the use of a fluid in the pedal simulator that is best suited to the requirements with respect to the brake fluid.

A man skilled in the art may make several changes and adjustments to the braking systems and to the actuation methods of braking systems for vehicles described above in order to meet specific and incidental needs, all falling within the scope of protection defined in the following claims.

The invention claimed is:

1. A braking system for vehicles comprising:
   a pilot pump provided with a lever and/or pedal-operated manual actuation device, which is fluidically connected, via a first hydraulic duct to an absorber device which simulates the drive resistance offered by at least one braking device associated with a wheel of said vehicle, wherein, along said first hydraulic duct a first shut-off valve is arranged,
   at least one electromechanical and/or electro-hydraulic actuator device, operatively connected to at least one electricity storage device and to said at least one braking device for the actuation of the latter,
   at least one sensor, belonging to a group comprising position sensors of the stroke and/or rotation of the lever or pedal operated manual actuation device or of a float or of a push-rod of the pilot pump, force sensors of the force applied to said lever or pedal operated manual actuation device or to the float or cylinder of the pilot pump, pressure sensors of the pilot pump delivery pressure, suitable to detect the occurrence and magnitude of a braking action request,
   the braking system comprising at least one control unit operatively connected to said at least one sensor and to the at least one actuator device and being programmed so as to actuate the braking device via the actuator device when it receives from said at least one sensor a braking action request signal,
   wherein the control unit is programmed to actuate the actuator device without input to the lever and/or pedal-operated manual actuation device so as to avoid blocking of one or more wheels or the occurrence of instability of the vehicle during braking,
   wherein the control unit is programmed to induce on the manual actuation device at least one vibration when the control unit corrects the braking action, wherein the vibration is adapted to provide input from the braking system to an object that is resting on the manual actuation device, wherein said input to the braking system does not lengthen a stroke of the lever and/or pedal-operated manual actuation device, wherein said at least one sensor comprises a dual power supply via two distinct electricity storage devices.

2. The braking system for vehicles according to claim 1, further comprising at least two sensors belonging to a group comprising position sensors of the stroke of the lever or pedal, force sensors of the force applied to said lever or pedal, pressure sensors of the pilot pump delivery pressure, suitable to detect the occurrence and magnitude of said braking action request exerted by the user through said lever or pedal.

3. The braking system for vehicles according to claim 1, wherein at least one pressure sensor is provided arranged along the first hydraulic duct or in correspondence with the absorber device.

4. The braking system for vehicles according to claim 1, wherein at least one force sensor is provided applied on the manual actuation device or on the float of the pilot pump.

5. The braking system for vehicles according to claim 1, wherein at least one position sensor is provided applied on the manual actuation device or on the float of the pilot pump, so as to detect the stroke/position.

6. The braking system for vehicles according to claim 1, wherein the system comprises at least two electricity storage devices which each power at least control unit and at least one actuator device, said electricity storage devices being of different types.

7. The braking system for vehicles according to claim 6, wherein said at least two electricity storage devices are electrically interconnected each other.

8. The braking system for vehicles according to claim 1, wherein the at least one control unit is programmed so that, during the correction of the requested braking action, it alternately opens and closes the first shut-off valve so as to create a pressure variation on the first hydraulic duct and on the manual actuation device.

9. The braking system for vehicles according to claim 1, wherein the system comprises a pressure variation device in the first hydraulic duct operatively connected to the control unit so as to change the pressure in said first hydraulic duct to induce at least a vibration on the manual actuation device, during the correction of the requested braking action.

10. The braking system for vehicles according to claim 9, wherein said pressure variation device in the first hydraulic duct comprise a pump with axial or radial pistons, fluidically connected with said first hydraulic duct.

11. The braking system for vehicles according to claim 9, wherein said pressure variation device in the first hydraulic duct comprise a cam-piston system, the piston being fluidically connected with said first hydraulic duct.

12. The braking system for vehicles according to claim 1, wherein the system comprises a movable mechanical device, arranged between the manual actuation device and the pilot pump, said movable mechanical device being operatively connected to at least a control unit which is programmed so as to induce vibrations on the manual actuation device by actuating the movable mechanical device, during the correction of the requested braking action.

13. The braking system for vehicles according to claim 12, wherein the movable mechanical device comprise a rotary electric motor provided with eccentric mass with respect to a rotation axis of the motor.

14. The braking system for vehicles according to claim 12, wherein the movable mechanical means comprise an electric motor with relative sliding mass.

15. The braking system for vehicles according to claim 12, wherein the movable mechanical device is a vibrating mechanical device which comprise a piezoelectric device.

16. The braking system for vehicles according to claim 15, wherein said piezoelectric device is associated with a relative mass.

17. The braking system for vehicles according to claim 1, wherein said at least one braking device comprises a disc brake, or drum or shoe brake.

18. An actuation method of a braking system for vehicles, comprising the steps of:

providing a pilot pump provided with lever and/or pedal-operated manual actuation device, which is fluidically connected, via a first hydraulic duct to an absorber device which simulates the drive resistance offered by a hydraulically-operated braking device associated with a wheel of said vehicle, wherein, along said first hydraulic duct a first shut-off valve is arranged, providing two electromechanical and/or electro-hydraulic actuator devices, operatively connected to two distinct electricity storage devices and to at least one braking device for the actuation of the latter, providing at least one sensor, belonging to a group comprising position sensors of the stroke of the lever or pedal, force sensors of the force applied to said lever or pedal, pressure sensors of the pilot pump delivery pressure, suitable to detect the occurrence and magnitude of a braking action request, wherein said at least one sensor is connected to the two distinct electricity storage devices, providing at least one control unit operatively connected to said at least one sensor and to the at least one actuator device and being programmed so as to actuate the braking device via the actuator device when it receives from said at least one sensor a braking action request signal, wherein the control unit is programmed to actuate the actuator device without input to the lever and/or pedal-operated manual actuation device so as to avoid blocking of one or more wheels or the occurrence of instability of the vehicle during braking, and inducing on the manual actuation device at least one vibration when the control unit corrects the braking action, wherein the vibration is adapted to provide input from the braking system to an object that is resting on the manual actuation device, wherein said input to the braking system does not lengthen a stroke of the lever and/or pedal-operated manual actuation device.

* * * * *